US012651607B2

(12) United States Patent
Takahashi

(10) Patent No.: US 12,651,607 B2
(45) Date of Patent: Jun. 9, 2026

(54) INFORMATION PROCESSING APPARATUS AND METHOD THAT USE LEARNING MODELS TO ALTER WATERMARK INFORMATION BASED ON MIXED AUDIO SIGNALS

(71) Applicant: Sony Group Corporation, Tokyo (JP)

(72) Inventor: Naoya Takahashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 180 days.

(21) Appl. No.: 18/691,047

(22) PCT Filed: Feb. 16, 2022

(86) PCT No.: PCT/JP2022/006048
§ 371 (c)(1),
(2) Date: Mar. 12, 2024

(87) PCT Pub. No.: WO2023/053480
PCT Pub. Date: Apr. 6, 2023

(65) Prior Publication Data

US 2024/0379117 A1 Nov. 14, 2024

(30) Foreign Application Priority Data

Sep. 28, 2021 (JP) ................................ 2021-157816

(51) Int. Cl.

*G10L 25/30* (2013.01)
*G10L 21/0272* (2013.01)
*G10L 25/03* (2013.01)

(52) U.S. Cl.
CPC .......... *G10L 25/30* (2013.01); *G10L 21/0272* (2013.01); *G10L 25/03* (2013.01)

(58) Field of Classification Search
CPC ..... G10L 25/30; G10L 21/0272; G10L 25/03; G10L 19/018; G06N 3/02
See application file for complete search history.

(56) References Cited

U.S. PATENT DOCUMENTS 10,236,006 B1 * 3/2019 Gurijala .................. G10L 19/02
2012/0203362 A1 * 8/2012 Parvaix ................ G10L 19/018 700/94

(Continued)

FOREIGN PATENT DOCUMENTS

JP 2004-500728 A 1/2004
JP 2018186464 A 11/2018

(Continued)

OTHER PUBLICATIONS

International Search Report and Written Opinion mailed on Apr. 19, 2022, received for PCT Application PCT/JP2022/006048, filed on Feb. 16, 2022, 9 pages including English Translation.

(Continued)

*Primary Examiner* — Michael N Opsasnick
(74) *Attorney, Agent, or Firm* — XSENSUS LLP

(57) ABSTRACT

An information processing apparatus includes a decoder that extracts, using a certain learning model, additional information included in a mixed sound signal where a plurality of sound source signals is mixed together. A change in the sound source signals and the mixed sound signal caused by addition of the additional information is imperceptible.

17 Claims, 8 Drawing Sheets

(56) References Cited

U.S. PATENT DOCUMENTS

| | | | | |
|---|---|---|---|---|
| 2016/0140968 | A1* | 5/2016 | Paulus | G10L 19/008 381/22 |
| 2019/0198036 | A1 | 6/2019 | Osako | |
| 2020/0014817 | A1* | 1/2020 | Deshmukh | H04N 1/32309 |
| 2020/0134447 | A1* | 4/2020 | Bennett | G06F 16/68 |
| 2021/0223780 | A1* | 7/2021 | Bramley | G06V 20/56 |
| 2021/0256978 | A1 | 8/2021 | Zeyu | |
| 2024/0371390 | A1* | 11/2024 | Takahashi | G10L 25/30 |
| 2024/0379117 | A1* | 11/2024 | Takahashi | G06N 3/045 |

FOREIGN PATENT DOCUMENTS

| | | | |
|---|---|---|---|
| JP | 2021157816 | | 9/2021 |
| WO | 2018/047643 | A1 | 3/2018 |
| WO | WO-2021009319 | A1 | 1/2021 |

OTHER PUBLICATIONS

Felix Kreuk et al: "Hide and Speak: Towards Deep Neural Networks for Speech Steganography", arxiv.org, Cornell University Library, 201 Olin Library Cornell University Ithaca, NY 14853, Jul. 27, 2020 (Jul. 27, 2020) , XP081702581.

Naoya Takahashi et al: "Source Mixing and Separation Robust Audio Steganography", arxiv.org, Cornell University Library, 201 Olin Library Cornell University Ithaca, NY 14853, Oct. 11, 2021 (Oct. 11, 2021), XP091075534.

* cited by examiner

FIG. 7

| Model | SDR | | CER | |
|---|---|---|---|---|
| | original | separation | original | separation |
| Random | – | – | 96.3% | 96.3% |
| Baseline(original) | 29.5 | 30.8 | 0.0% | 96.3% |
| STSS(separation) | 34.6 | 37.3 | 38.5% | 0.0% |
| STSS(separation+original) | 35.2 | 37.9 | 0.0% | 0.0% |

INFORMATION PROCESSING APPARATUS AND METHOD THAT USE LEARNING MODELS TO ALTER WATERMARK INFORMATION BASED ON MIXED AUDIO SIGNALS

CROSS-REFERENCE TO RELATED APPLICATIONS

The present application is based on PCT filing PCT/JP2022/006048, filed Feb. 16, 2022, which claims priority to Japanese Patent Application No. 2021-157816, filed Sep. 28, 2021, the entire contents of each are incorporated herein by reference.

TECHNICAL FIELD

The present disclosure relates to an information processing apparatus, an information processing method, and a program.

BACKGROUND ART

Various proposals have been made regarding sound source separation, such as deep neural network (DNN)-based sound source separation (see, for example, Patent Document 1 below). In recent years, secondary use of separated sound sources (hereinafter also referred to as separation signals as necessary) has also become possible. Furthermore, separation signals are also distributed as sound source materials on the premise of being mixed with other sound source signals.

CITATION LIST

Patent Document

Patent Document 1: WO 2018/047643 A

SUMMARY OF THE INVENTION

Problems to be Solved by the Invention

By the way, in a case where a separation signal is used as is or mixed with another sound source signal, how to prevent abuse of the separation signal and protect the right of a sound source creator (a creator of each sound source signal, a creator of a mixed sound signal before separation, or another person) needs to be considered. A general digital watermark technology of embedding information in an audio signal is based on the premise that an original mixed sound signal or a sound source signal is distributed as is, and it is not assumed that sound source separation is performed on a mixed sound signal or an original sound source signal is mixed with another sound source signal. That is, in a case where sound source separation or a process for mixing a plurality of sound source signals together is performed on an original mixed sound signal or sound source signal, it is difficult to detect digital watermark information embedded in the original signal, which poses a problem that a copyright cannot be protected or that smooth distribution of the mixed sound signal or the sound source signal is hindered.

An object of the present disclosure is to provide an information processing apparatus, an information processing method, and a program capable of appropriately detecting information, such as digital watermark information, embedded in a signal.

Solutions to Problems

The present disclosure is, for example, an information processing apparatus including a decoder that extracts, using a certain learning model, additional information included in a mixed sound signal where a plurality of sound source signals is mixed together, in which change in the sound source signals and the mixed sound signal caused by addition of the additional information is imperceptible.

The present disclosure is, for example, an information processing method including extracting, using a decoder and a certain learning model, additional information included in a mixed sound signal where a plurality of sound source signals is mixed together, in which change in the sound source signals and the mixed sound signal caused by addition of the additional information is imperceptible.

The present disclosure is, for example, a program causing a computer to perform an information processing method including extracting, using a decoder and a certain learning model, additional information included in a mixed sound signal where a plurality of sound source signals is mixed together, in which a change in the sound source signals and the mixed sound signal caused by addition of the additional information is imperceptible.

The present disclosure is, for example, an information processing apparatus including a concealer that includes, using a certain learning model, additional information in a plurality of sound source signals or a mixed sound signal where the plurality of sound source signals is mixed together, in which a change in the sound source signals and the mixed sound signal caused by addition of the additional information is imperceptible.

The present disclosure is, for example, an information processing method including a concealer that includes, using a certain learning model, additional information in a plurality of sound source signals or a mixed sound signal where the plurality of sound source signals is mixed together, in which a change in the sound source signals and the mixed sound signal caused by addition of the additional information is imperceptible.

The present disclosure is, for example, a program causing a computer to perform an information processing method including including, using a concealer and a certain learning model, additional information in a plurality of sound source signals or a mixed sound signal where the plurality of sound source signals is mixed together, in which a change in the sound source signals and the mixed sound signal caused by addition of the additional information is imperceptible.

BRIEF DESCRIPTION OF DRAWINGS

FIG. 7 is a diagram referred to when an effect produced by the embodiment is described.

MODE FOR CARRYING OUT THE INVENTION

Hereinafter, embodiments and the like of the present disclosure will be described with reference to the drawings. Note that the description will be given in the following order.

Embodiment

<Modifications>

The embodiments and the like described below are preferred specific examples of the present disclosure, and the content of the present disclosure is not limited to these embodiments and the like.

Embodiment

[Configuration Example of Playback System]

Figure 1:
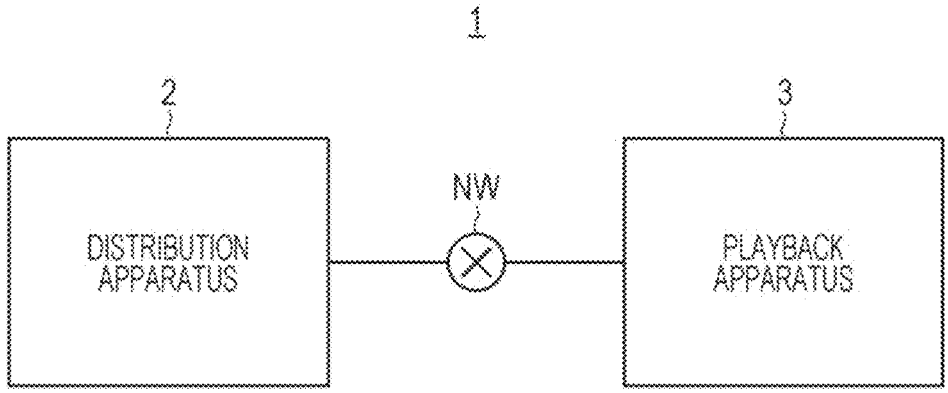
FIG. 1 is a diagram for explaining an outline of a system according to an embodiment.

FIG. 1 illustrates a configuration example of a playback system (playback system 1) according to an embodiment. The playback system 1 includes a distribution apparatus 2 and a playback apparatus 3 connected over a network NW. There may be a plurality of distribution apparatuses 2 and playback apparatuses 3. The distribution apparatus 2 and the playback apparatus 3 correspond to an example of an information processing apparatus. The internet is a representative example of the network NW, but a local area network (LAN), Bluetooth (registered trademark), Wi-Fi (registered trademark), or the like may be used, instead. Furthermore, the distribution apparatus 2 and the playback apparatus 3 may be connected to each other by wire. Although the playback apparatus 3 will be described as a smartphone in the present embodiment, the playback apparatus 3 may be any apparatus such as a personal computer, one of hearable devices including headphones, earphones, and the like, another wearable device, or the like.

As an example, the distribution apparatus 2 includes a concealer that includes, using a certain learning model, additional information in a plurality of sound source signals or a mixed sound signal where the plurality of sound source signals is mixed together. It is assumed here that a change in the sound source signals and the mixed sound signal caused by the addition of the additional information is imperceptible. The mixed sound signal including the additional information is transmitted to the playback apparatus 3 over the network NW. The playback apparatus 3 includes, for example, a decoder that extracts, using a certain learning model, additional information included in a mixed sound signal where a plurality of sound source signals is mixed together. It is assumed that a change in the sound source signals and the mixed sound signal caused by the addition of the additional information is imperceptible. Note that "imperceptible" herein means that a level of change in sound source signals and a mixed sound signal caused by addition of additional information is so low that a user (a listener of the sound source signals and the mixed sound signal) cannot perceive the change. The concealer and the decoder include a neural network. Furthermore, the same learning model obtained through learning that will be described later can be used as the learning model used by the concealer and the learning model used by the decoder. Note that digital watermark information will be described as an example of the additional information in the present embodiment, but the additional information may be a type of sound source signal or information (names of a song, an artist, and the like) regarding the sound source signal, or may be digital watermark information including these.

[Configuration Example of Playback Apparatus]

Figure 2:
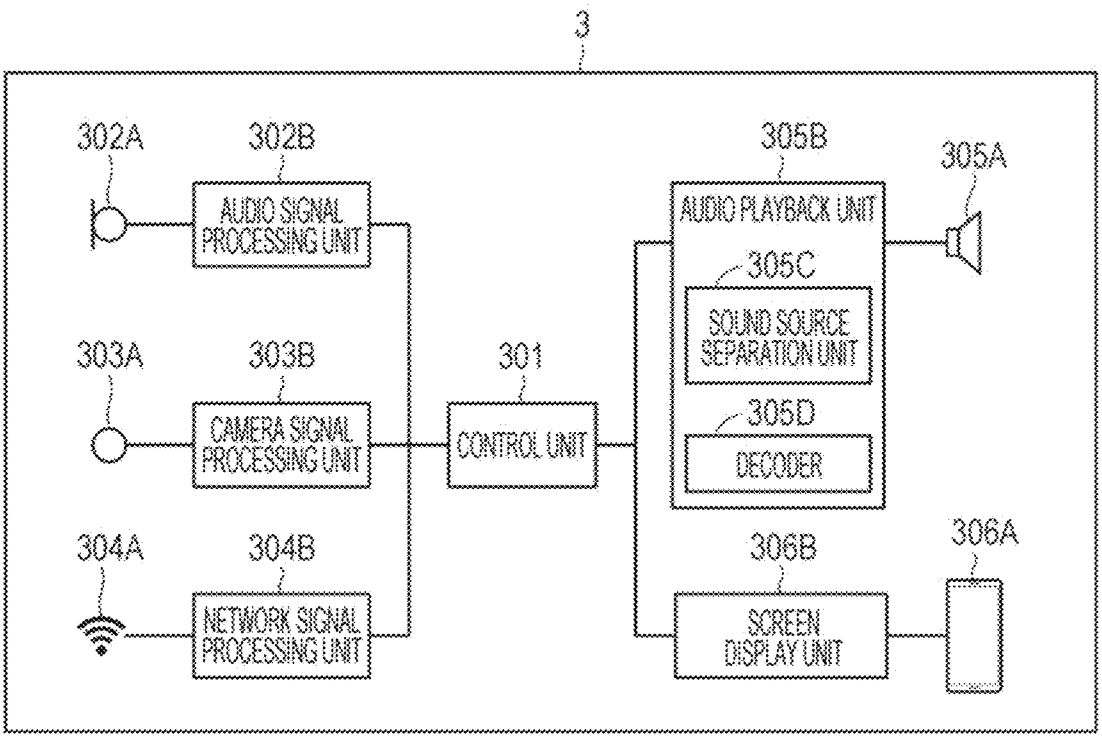
FIG. 2 is a block diagram illustrating an example of the configuration of a playback apparatus according to the embodiment.

FIG. 2 is a block diagram illustrating a configuration example of the playback apparatus 3 according to the embodiment. The playback apparatus 3 includes a control unit 301, a microphone 302A, an audio signal processing unit 302B connected to the microphone 302A, a camera unit 303A, a camera signal processing unit 303B connected to the camera unit 303A, a network unit 304A, a network signal processing unit 304B connected to the network unit 304A, a speaker 305A, an audio playback unit 305B connected to the speaker 305A, a display 306A, and a screen display unit 306B connected to the display 306A. The audio signal processing unit 302B, the camera signal processing unit 303B, the network signal processing unit 304B, the audio playback unit 305B, and the screen display unit 306B are each connected to the control unit 301.

The control unit 301 is achieved by a central processing unit (CPU) or the like. The control unit 301 includes a read only memory (ROM) storing programs, a random access memory (RAM) used as a work area when the programs are executed, and the like (these are not illustrated). The control unit 301 controls the entirety of the playback apparatus 3.

The microphone 302A collects the user's utterance and the like. The audio signal processing unit 302B performs known audio signal processing on audio data regarding a sound collected through the microphone 302A.

The camera unit 303A includes an optical system such as a lens, an imaging device, and the like. The camera signal processing unit 303B performs image signal processing, such as analog-to-digital (A/D) conversion, various types of correction, and object detection, on an image (may be a still image or a moving image) obtained through the camera unit 303A.

The network unit 304A includes an antenna and the like. The network signal processing unit 304B performs modulation, demodulation, error correction, and the like on data communicated through the network unit 304A.

The audio playback unit 305B performs processing for playing back a sound from the speaker 305A. The audio playback unit 305B performs, for example, amplification processing and D/A conversion. Furthermore, the audio playback unit 305B also performs processing for generating a sound to be played back from the speaker 305A.

Furthermore, the audio playback unit 305B also includes a sound source separation unit 305C. The sound source separation unit 305C performs sound source separation on a mixed sound signal that has been obtained by mixing a plurality of sound source signals and with which perturbations optimized to improve sound source separation performance have also been mixed. Note that, in a case where a mixed sound signal is played back, that is, in a case where sound source separation is not performed, the control unit 301 causes the sound source separation unit 305C not to operate. A subset of separation signals obtained as a result of sound source separation may be played back from the speaker 305A, or each of the separation signals may be stored in an appropriate memory.

The audio playback unit 305B also includes a decoder 305D. As described above, the decoder 305D extracts digital watermark information from a mixed sound signal including a plurality of sound source signals or separation signal obtained by performing sound source separation on the mixed sound signal. Note that the sound source separation unit 305C and the decoder 305D need not necessarily be included in the audio playback unit 305B. Furthermore, as described later, the decoder 305 might be achieved by one decoder or might be achieved by a plurality of decoders.

As the display 306A, a liquid crystal display (LCD), an organic electro-luminescence (EL) display, or the like may be used. The screen display unit 306B performs known processing for displaying various types of information on the display 306A. Note that the display 306A may be implemented as a touch panel. In this case, the screen display unit 306B also performs a process for detecting an operation position of a touch operation or the like.

System Configuration Example of Embodiment

First Example

Figure 3:
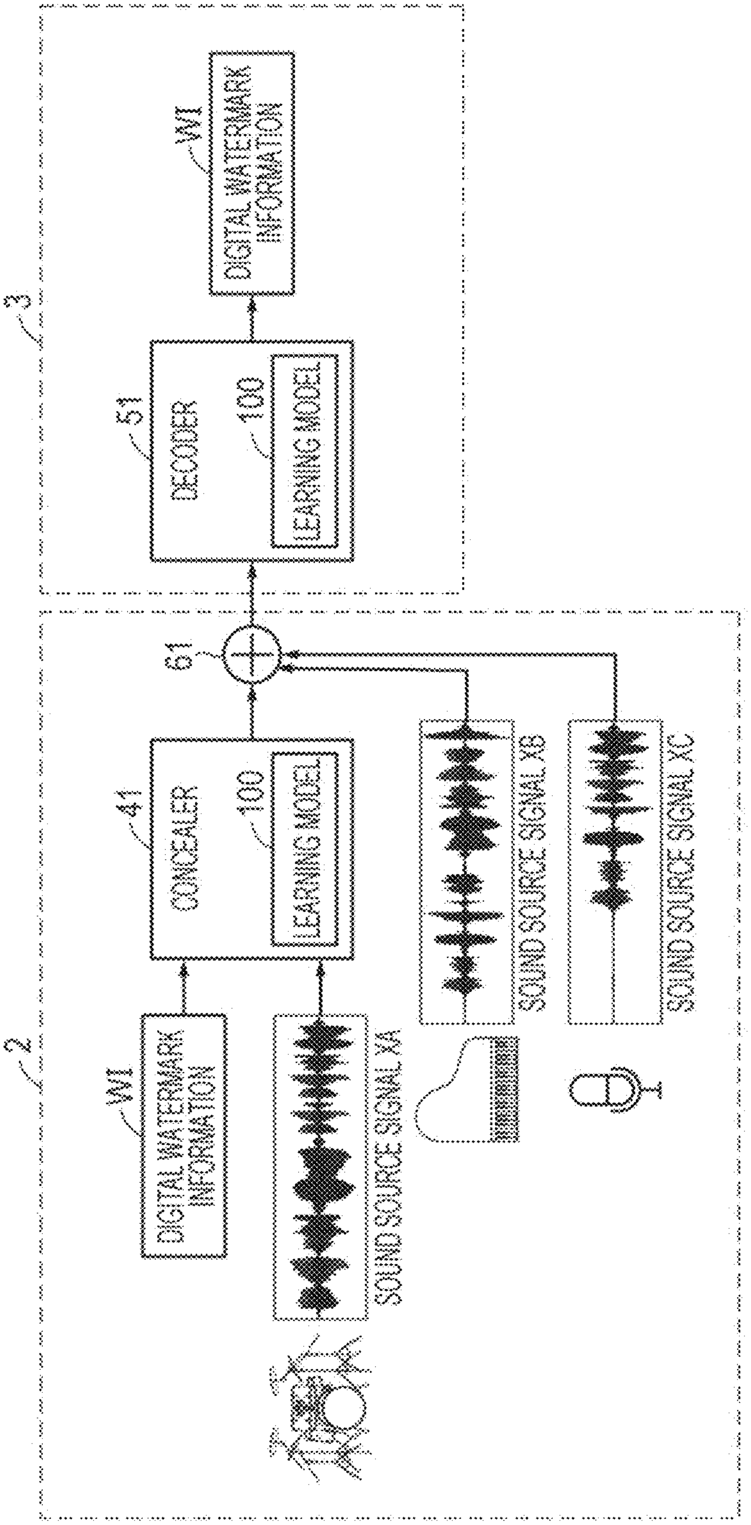
FIG. 3 is a diagram for explaining an example of the configuration of the system according to the embodiment.
Figure 4:
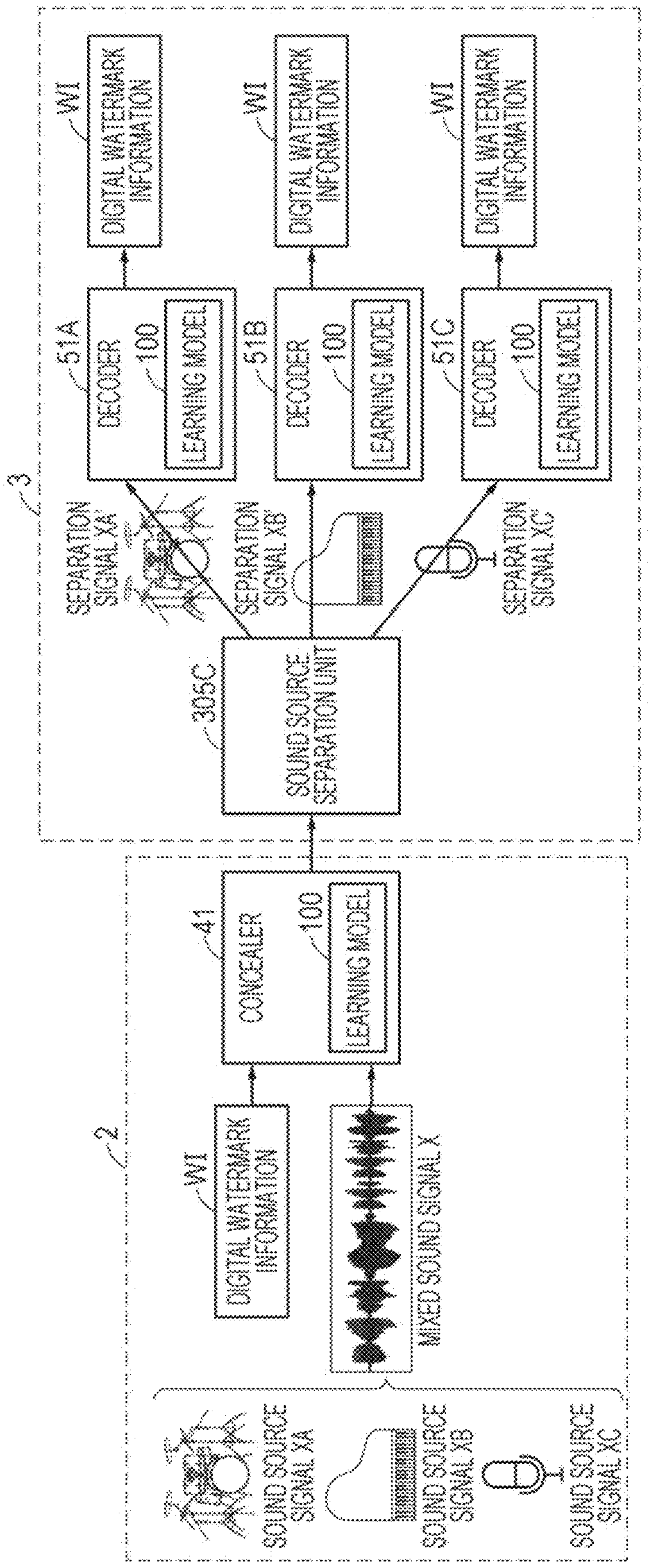
FIG. 4 is a diagram for explaining another configuration example of the system according to the embodiment.
Figure 5:
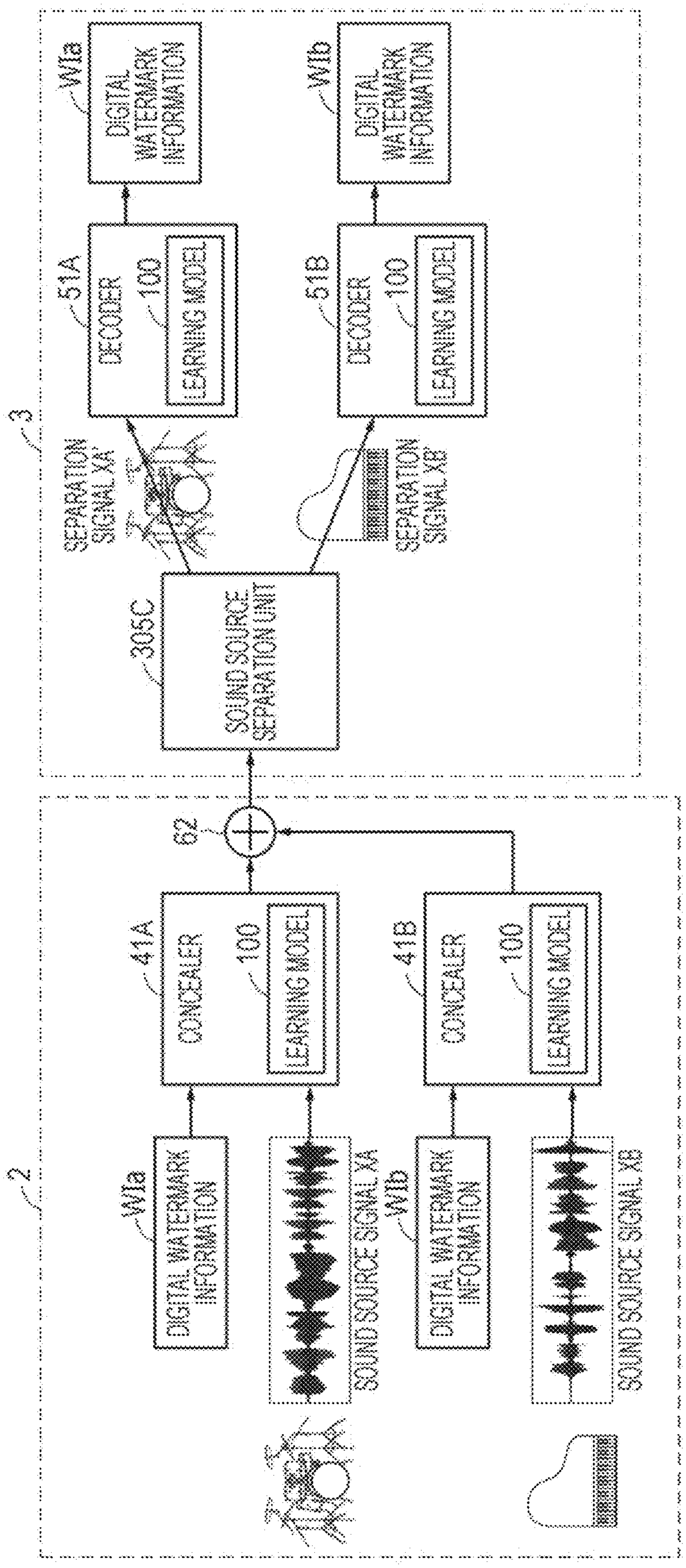
FIG. 5 is a diagram for explaining another configuration example of the system according to the embodiment.

Next, a system configuration example according to the embodiment will be described with reference to FIGS. 3 to 5. First, a first example will be described with reference to FIG. 3.

The first example is an example where a mixed sound signal x includes three sound source signals (sound source signals XA, XB, and XC). The sound source signal XA is, for example, a drum sound source signal, the sound source signal XB is, for example, a vocal sound source signal, and the sound source signal XC is, for example, a piano sound source signal. The distribution apparatus 2 includes, for example, a concealer 41 and an adder 61. The playback apparatus 3 includes a decoder 51 corresponding to the above-described decoder 305D.

The concealer 41 includes (embeds), using a learning model 100, digital watermark information WI in a subset of the plurality of sound source signals, that is, for example, the drum sound source signal XA. The adder 61 adds up the drum sound source signal XA including the digital watermark information WI, the vocal sound source signal XB that does not include the digital watermark information WI, and the piano sound source signal XC that does not include the digital watermark information WI to generate a mixed sound signal X. The mixed sound signal X is transmitted to the playback apparatus 3 through a communication unit (not illustrated). Note that the mixed sound signal X may be compressed by an appropriate method.

The playback apparatus 3 receives the mixed sound signal X through the communication unit (not illustrated). The decoder 51 extracts the digital watermark information WI included in the mixed sound signal X using the learning model 100. The playback apparatus 3 permits playback of the mixed sound signal X by the audio playback unit 305B by, for example, performing authentication using the digital watermark information WI.

Second Example

Next, a second example will be described with reference to FIG. 4. In the second example, the concealer 41 includes digital watermark information WI in a mixed sound signal X. As sound source signals included in the mixed sound signal X, the same sound source signals (sound source signals XA to XC) as in the first example may be used.

The playback apparatus 3 includes, for example, decoders 51A to 51C. The decoders 51A to 51C extract the digital watermark information WI included in the corresponding sound source signals. The mixed sound signal X received by the playback apparatus 3 is subjected to sound source separation performed by the sound source separation unit 305C to be separated into separation signals XA 'to XC'. The sound source separation unit 305C performs sound source separation, for example, using a DNN-based sound source separation model.

The digital watermark information WI embedded in the mixed sound signal X can be left in a sound source separation result using the learning model 100 obtained by performing learning that will be described later. The decoder 51A extracts the digital watermark information WI included in the separation signal XA' using the learning model 100. The decoder 51B extracts the digital watermark information WI included in the separation signal XB' using the learning model 100. The decoder 51C extracts the digital watermark information WI included in the separation signal XC' using the learning model 100.

Third Example

Next, a third example will be described with reference to FIG. 5. The third example is an example where a mixed sound signal X includes a drum sound source signal XA and a piano sound source signal XB and digital watermark information is embedded in each sound source signal. Furthermore, the distribution apparatus 2 includes concealers 41A and 41B corresponding to the sound source signals. The concealer 41A embeds digital watermark information WIa in the sound source signal XA using the learning model 100. Furthermore, the concealer 41B embeds digital watermark information WIb in the sound source signal XB using the learning model 100. As in this example, a configuration is possible where a plurality of concealers that performs processing in parallel are included. One concealer may sequentially perform a process for embedding the digital watermark information WIa and WIb. The adder 62 adds up the two signals in which the digital watermark information is embedded to generate the mixed sound signal X in this example.

The sound source separation unit 305C performs sound source separation on the mixed sound signal X to generate a separation signal XA' and a separation signal XB'. The decoder 51A performs processing on the separation signal XA' using the learning model 100 to extract the digital watermark information WIa included in the separation signal XA'. Furthermore, the decoder 51B performs processing on the separation signal XB' using the learning model 100 to extract the digital watermark information WIb included in the separation signal XB'. Note that, in this example, digital watermark information may be embedded in only a subset of the sound source signals (for example, the drum sound source signal XA) or may be embedded in both a subset or all of the sound source signals and the mixed sound signal.

[Learning Model]

Figure 6:
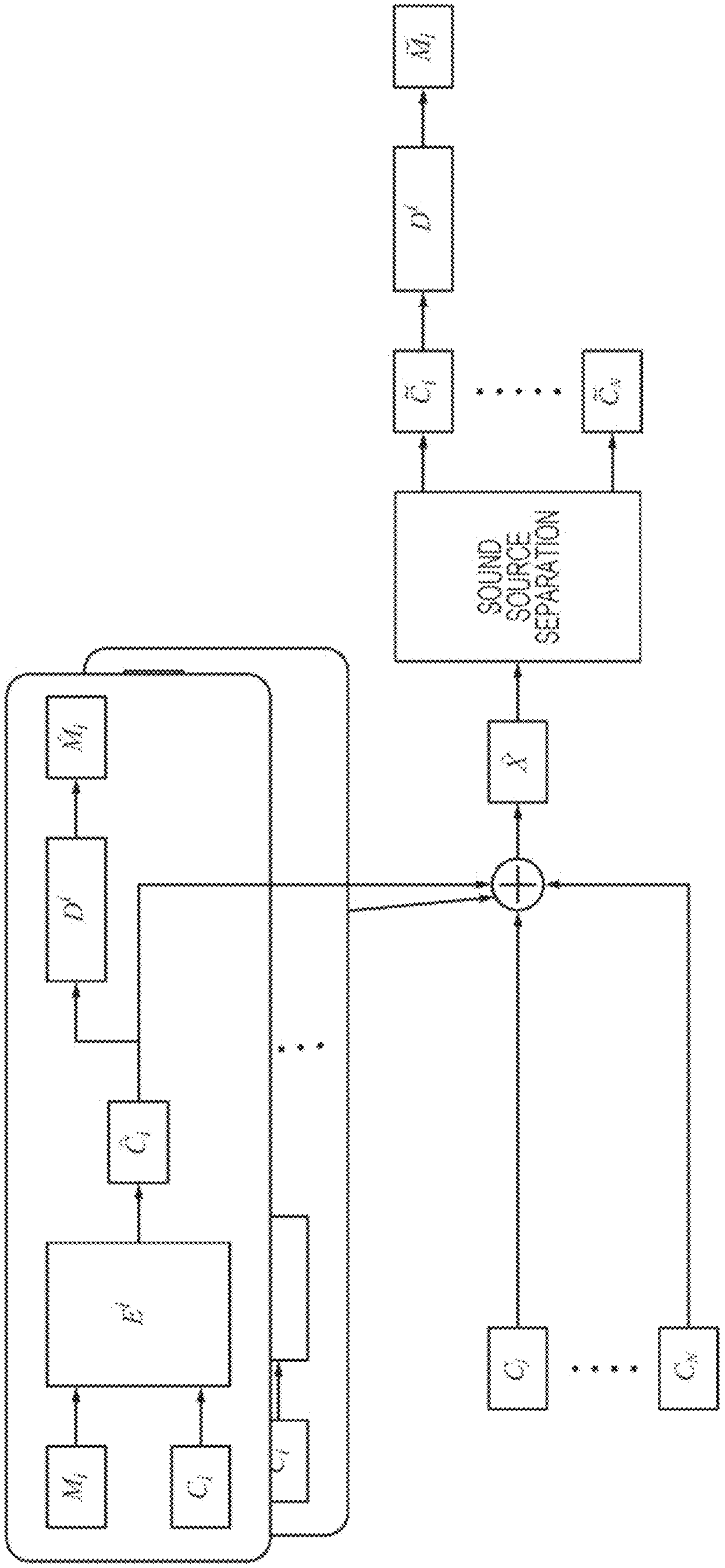
FIG. 6 is a diagram referred to when a learning model that can be used by a concealer and a decoder according to the embodiment is described.

Next, a learning model that can be used by the concealer and the decoder according to the embodiment will described with reference to FIG. 6. FIG. 6 is a diagram where processing performed in the present embodiment is generalized. Note that it seems as if all processing that can be performed in the present embodiment is included in FIG. 6 since FIG. 6 illustrates processing in a generalized manner, but it is not always necessary to perform all the processing illustrated in FIG. 6.

In FIG. 6, $E^i$ indicates the concealer, and $D^i$ indicates the decoder.

Furthermore, $C$ indicates a sound source signal. This sound source signal, however, may be one sound source signal or a mixed sound signal including a plurality of sound source signals. Furthermore, $M$ indicates digital watermark information.

Furthermore, $\hat{C}$ indicates a sound source signal in which the digital watermark information is embedded.

$\hat{X}$ indicates a signal obtained by adding up sound source signals, that is, a mixed sound signal.

$\tilde{C}$ indicates a separation signal obtained through sound source separation, $\hat{M}$ indicates digital watermark information obtained by decoding $\hat{C}$ using the decoder without addition or sound source separation, and $\tilde{M}$ indicates digital watermark information obtained by decoding $\tilde{C}$ using the decoder.

Here, a set of sound source signals in which digital watermark information is embedded is indicated by $$(1, \ldots, n) = \Gamma,$$

and a set of sound source signals in which digital watermark information is not embedded is indicated by $$(n+1, \ldots, N) = \overline{\Gamma}.$$

In a case where n=N, it means that digital watermark information is embedded in all the sound source signals.

A signal obtained by embedding digital watermark information $M_i$ in a certain sound source signal $C_i$ can be represented as:

$$\hat{C}_i = C_i + E^i(C_i, M_i)$$

Based on the sets described above, the mixed sound signal $\hat{X}$ can be represented as:

$$\hat{X} = \sum_{i=1}^{n} \hat{C}_i + \sum_{j=n+1}^{N} C_j$$

Furthermore, when a sound source separation model (for example, the same model as the learning model 100) is denoted by f, a sound source separation result can be represented as:

$$\tilde{C}_i = f(\hat{X})$$

Note that the sound source separation model f may be a weighted average of a plurality of sound source separation models $\hat{f}_j$.

Furthermore, digital watermark information obtained by decoding a sound source signal without performing sound source separation can be represented as:

$$\hat{M}_i = D^i(\hat{C}_i)$$

Digital watermark information obtained by decoding a separation signal that is a result of sound source separation can be represented as:

$$\tilde{M}_i = D^i(\tilde{C}_i)$$

The learning model 100 is obtained by performing learning for minimizing a loss function L represented by the following Expression 1. Parameters of the neural networks of the concealer and the decoder are optimized on the basis of a result of the learning. As an optimization method, for example, a stochastic gradient method may be used.

$$L = \sum_{i\in\Gamma} \lambda_1 d_c(C_i, \hat{C}_i) + \lambda_2 d_c(\hat{C}_i, \tilde{C}_i) + \lambda_3 d_m(M_i, \hat{M}_i) + \lambda_4 d_m(M_i, \tilde{M}_i) \quad \text{Expression 1}$$

In Expression 1, $\lambda_1$ to $\lambda_4$ are weight parameters. Furthermore, $d_c$ and $d_m$ are error functions, and in this example, an L1 norm (distance) is used as $d_c$, and cross entropy is used as $d_n$. That is, the learning model 100 according to the present embodiment is a model obtained by performing learning for minimizing a loss function based on an error function between sound source signals before and after digital watermark information is included in the sound source signals, an error function between signals obtained by including the digital watermark information in the sound source signals and signals corresponding to the sound source signals obtained through sound source separation, an error function between pieces of the digital watermark information before and after the digital watermark information is included in the sound source signals, and an error function between the digital watermark information before the digital watermark information is included in the sound source signals and the digital watermark information included in the sound source signals obtained through the sound source separation.

A first term on a right-hand side of Expression 1 is a term for making a sound source signal before digital watermark information is embedded and a sound source signal after the digital watermark information is embedded as close to each other as possible in terms of acoustic properties (frequency characteristics and the like). A second term on the right-hand side of Expression 1 is a term for making a sound source signal before sound source separation and a sound source signal after the sound source separation as close to each other as possible in terms of the acoustic properties. A third term on the right-hand side of Expression 1 is a term for making digital watermark information obtained as a result of decoding without mixing with another sound source signal and sound source separation as close to original digital watermark information as possible. A fourth term on the right-hand side of Expression 1 is a term for making digital watermark information obtained as a result of decoding after the sound source separation as close to the original digital watermark information as possible.

The first and second terms included on the right-hand side of Expression 1 can make a signal in which digital watermark information is embedded substantially the same as an original signal, that is, a change from the original signal imperceptible. In other words, the digital watermark information can be made imperceptible information. Furthermore, even in a case where digital watermark information is included in a certain sound source signal and the sound source signal is mixed with another sound source signal, it is possible to prevent the digital watermark information from leaking to (not adversely affecting) the another sound source signal. Furthermore, all sound source signals after separation can be made substantially the same as sound source signals before the separation (a change caused by digital watermark information is imperceptible).

Example of Effects

Next, effects produced by the present embodiment will be described with reference to a result of an experiment illustrated in FIG. 7.

Note that the experiment was conducted under the following conditions.

- Digital watermark information: A string of 16 characters+ an end token indicating an end
- Character types: 27 types (alphabet of 26 letters, one end token)
- Dataset: A dataset of four sound source signals (vocal, drums, bass, and others)
- Sound source separation: DNN-based sound source separation model
- Sound source signal in which digital watermark information is embedded: Drum sound source signal Evaluation of the experiment was performed with respect to a signal-to-distortion ratio (SDR) and a character error rate (CER). The SDR is a sound-to-total-distortion ratio, and a larger SDR indicates a better result. The CER is a character error rate (1−accuracy rate), and a smaller CER indicates a better result. Furthermore, in FIG. 7, "original" indicates processing in which the drum sound source signal, in which the digital watermark information was embedded, was decoded without being mixed with another sound source signal, and "separation" indicates processing in which the drum sound source signal, in which the digital watermark information was embedded, was mixed with another sound source signal and a mixed sound signal was separated and then decoded.

The experiment was conducted in the following four patterns.

- Pattern 1 (random): A pattern in which characters considered to be correct are randomly used (a probability of 1/27)
- Pattern 2 (baseline (original)): A pattern in which the concealer and the decoder use a learning model obtained as a result of learning with a loss function that does not take into consideration sound source separation (a loss function based on only the first and third terms on the right-hand side of Expression 1).
- Pattern 3 (STSS (separation)): A pattern in which the concealer and the decoder use a learning model obtained as a result of learning with a loss function that takes into consideration only sound source separation (a loss function based on only the second and fourth terms on the right-hand side of Expression 1).
- Pattern 4 (STSS (separation+original)): A pattern in which the concealer and the decoder use a learning model obtained as a result of learning with the loss function represented by Expression 1.

In pattern 1, the CER was 96.3% for both "original" and "separation", that is, accuracy was low.

In pattern 2, the SDR and the CER were good for "original". Since the learning model was obtained using the loss function that does not take into consideration sound source separation, however, the SDR and the CER for "separation" deteriorated to 30.8% and 96.3%, respectively.

In pattern 3, since the learning model was obtained using the loss function that takes into consideration sound source separation, the SDR and the CER for "separation" were good. Since the learning model was obtained using the loss function that does not take into consideration decoding without sound source separation, however, the SDR and the CER for "original" deteriorated to 34.6% and 38.5%, respectively.

In pattern 4, the SDR for "original" and "separation" was good, namely 35.2% and 37.9%, respectively. In general, when the SDR exceeds 30%, a change in a sound source signal or a mixed sound signal caused by embedding digital watermark information becomes imperceptible. As a result of the experiment, it was confirmed that relevant criteria were met through the processing where the learning model 100 was used. Moreover, the CER for both "original" and "separation" was good, namely 0.0%. It was thus confirmed that accuracy of a processing result produced by pattern 4, that is, the concealer and the decoder that use the learning model 100 according to the present embodiment, was the highest.

[Example of UIs]

Figure 8A:
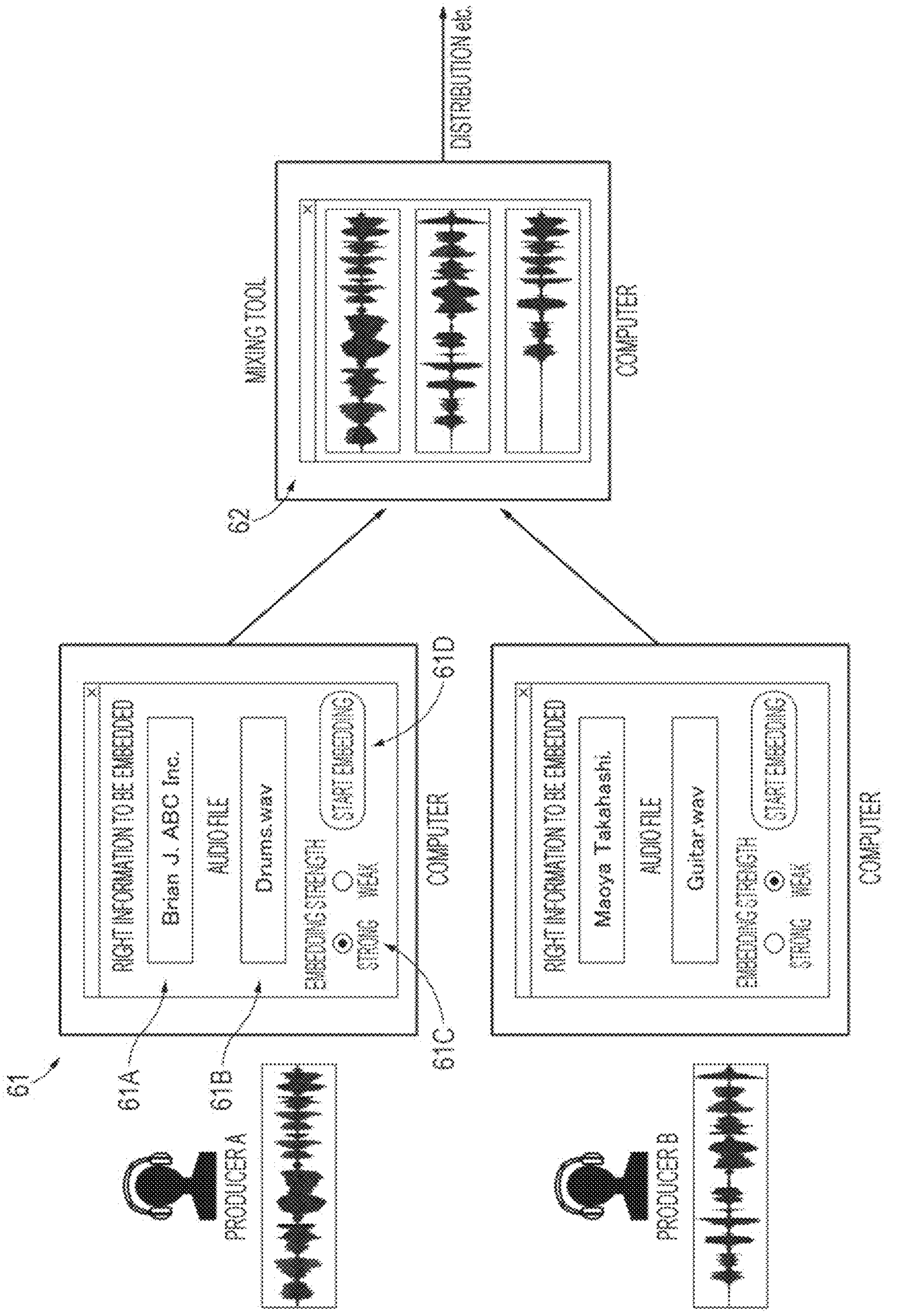
FIG. 8A is a diagram for explaining an example of user interfaces (UIs) applicable to the present disclosure.
Figure 8B:
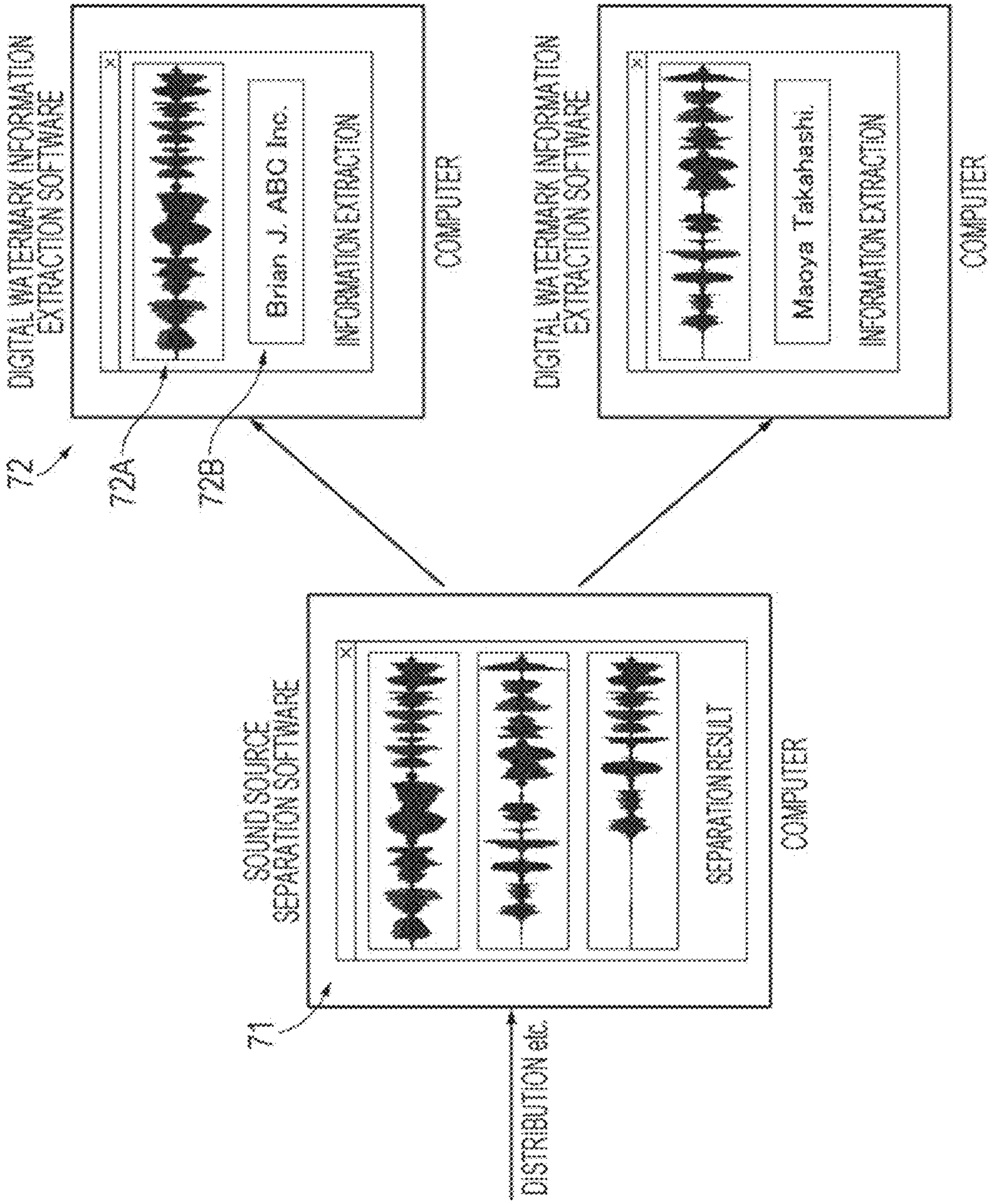
FIG. 8B is a diagram for explaining an example of other UIs applicable to the present disclosure.

FIGS. 8A and 8B illustrate an example of user interfaces (UIs) applicable to the present embodiment. The UIs illustrated in FIGS. 8A and 8B are displayed, for example, on display devices. FIG. 8A illustrates UIs mainly used on a distribution side, and FIG. 8B illustrates UIs used on a playback side.

For example, a UI 61 used by a producer A (content creator) on the distribution side includes, for example, an indication 61A for specifying digital watermark information to be embedded, an indication 61B for specifying an audio file in which the digital watermark information is to be embedded, an indication 61C for specifying embedding strength, and a button 61D for starting a process for embedding the digital watermark information in the specified audio file. The indication 61C includes, for example, radio buttons corresponding to embedding strength "strong" and embedding strength "weak", respectively. The embedding strength "strong" means that the digital watermark information will be embedded such that sound source signals before and after sound source separation become as close to each other as possible (such that a change caused by the digital watermark information becomes imperceptible as much as possible). In contrast, the embedding strength "weak" means that sound source signals before and after sound source separation are allowed to be slightly different from each other (a change caused by the digital watermark information is more or less perceived). For example, a learning model corresponding to each of the embedding strengths "strong" and"weak" can be obtained by changing a value of λ in Expression 1. A learning model to be used by the concealer is switched in accordance with selection of the embedding strength by the user. That is, by allowing the user to select the embedding strength, it becomes possible to select a learning model to be used when the digital watermark information is included. A UI used by a producer B also includes similar display elements.

Sound source signals in which digital watermark information has been embedded by the producers A and B are mixed together by a mixing tool to generate a mixed sound signal. A UI 62 relating to the mixing tool includes, for example, a waveform of each sound source signal. As a UI of the mixing tool, a known UI may be used. The mixing tool gives effects and the like.

The distributed mixed sound signal is subjected to sound source separation by sound source separation software. As illustrated in FIG. 8B, for example, an indication 71 including a waveform of each separation signal is displayed on an appropriate display unit. Furthermore, a UI 72 is displayed on the display unit as a result of execution of digital watermark information extraction software. The UI 72 includes, for example, a waveform indication 72A of a separated sound source and an indication 72B of extracted digital watermark information (a character string in the present embodiment). In a case where the learning model 100 is not used, digital watermark information is naturally not extracted, and the indication 72B is blank or indicates an error.

In a case where a character string corresponding to digital watermark information is extracted, secondary use of a separation signal is permitted. In addition to such an example of use, the extraction of a character string corresponding to digital watermark information can prevent unauthorized distribution of a separation signal. That is, in a case where digital watermark information is extracted by subjecting a sound source signal downloaded from a website that illegally distributes sound source signals to digital watermark information extraction software, the digital watermark information serves as evidence that the sound source signal has been distributed without permission. Various other applications that use digital watermark information are possible.

<Modifications>

Although an embodiment of the present disclosure has been described above, the present disclosure is not limited to the above-described embodiment, and various modifications can be made without departing from the gist of the present disclosure.

The processing described in the embodiment does not ensure that digital watermark information is retained and extracted in a case where a mixed or separated sound source signal is further mixed with another sound source signal. By changing the loss function as illustrated in the following Expression 2, therefore, it becomes possible to retain digital watermark information even in a case where mixing or separation have been performed twice.

$$L = \sum_{i\in\Gamma} \lambda_1 d_c(C_i, \hat{C}_i) + \lambda_2 d_c(\hat{C}_i, \tilde{C}_i) + \lambda_3 d_m(M_i, \hat{M}_i) + \lambda_4 d_m(M_i, \tilde{M}_i) + \lambda_5 d_m(M_i, \tilde{M}'_i) \quad \text{Expression 2}$$

Expression 2 is different from Expression 1 in that a fifth term is added to a right-hand side thereof.

Note, however, that $$\tilde{M}'_i = D(f'_i(X'))$$

$$X' = \tilde{C}_i + \sum C'$$

hold true.

D denotes a decoder, $f'_i$ denotes a sound source separator of a sound source i, and

C' denotes another sound source signal for a sound source signal obtained as a result of sound source separation.

Furthermore, λ is a weighting coefficient and is a value determined experimentally.

Note that by adding the term on the right-hand side in Expression 2, a loss function with which three, not two, or more times of sound source separation or mixing can be handled can be obtained.

Part of the processing described in the embodiment may be performed by an apparatus different from the distribution apparatus or the playback apparatus, that is, for example, a server. Any number and type of sound source signals included in a mixed sound signal may be used.

Furthermore, the present disclosure can also be implemented in any mode such as an apparatus, a method, a program, or a system. When downloading of a program for achieving the functions described in the above-described embodiment is possible and an apparatus that does not have the functions described in the embodiment downloads and installs the program, for example, the apparatus can perform the control described in the embodiment. The present disclosure can also be implemented by a server that distributes such a program. Furthermore, the items described in each of the embodiments and the modifications can be combined together as necessary. Furthermore, the contents of the present disclosure are not to be construed as being limited by the effects exemplified in the present specification.

The present disclosure may have the following configurations.

(1)

An information processing apparatus including a decoder that extracts, using a certain learning model, additional information included in a mixed sound signal where a plurality of sound source signals is mixed together, in which a change in the sound source signals and the mixed sound signal caused by addition of the additional information is imperceptible.

(2)

The information processing apparatus according to (1), in which the additional information is information added to the mixed sound signal where the plurality of sound source signals is mixed together.

(3)

The information processing apparatus according to (1), in which the decoder extracts the additional information from separation signals obtained by performing sound source separation on the mixed sound signal.

(4)

The information processing apparatus according to (1), in which at least one of the sound source signals constituting the mixed sound signal includes the additional information.

(5)

The information processing apparatus according to (4), in which each of the sound source signals constituting the mixed sound signal includes the additional information.

(6)

The information processing apparatus according to (3), further including a sound source separation unit that performs the sound source separation.

(7)

The information processing apparatus according to any one of (1) to (7), in which the learning model is a model obtained by performing learning for minimizing a loss function based on an error function between sound source signals before and after the additional information is included in the sound source signals, an error function between signals obtained by including the additional information in the sound source signals and signals corresponding to the sound source signals obtained through sound source separation, an error function between pieces of the additional information before and after the additional information is included in the sound source signals, and an error function between the additional information before the additional information is included in the sound source signals and the additional information included in the sound source signals obtained through the sound source separation.

(8)

The information processing apparatus according to any one of (1) to (7), in which the additional information is digital watermark information.

(9)

An information processing method including extracting, using a decoder and a certain learning model, additional information included in a mixed sound signal where a plurality of sound source signals is mixed together, in which a change in the sound source signals and the mixed sound signal caused by addition of the additional information is imperceptible.

(10)

A program causing a computer to perform an information processing method including extracting, using a decoder and a certain learning model, additional information included in a mixed sound signal where a plurality of sound source signals is mixed together, in which a change in the sound source signals and the mixed sound signal caused by addition of the additional information is imperceptible.

(11)

An information processing apparatus including a concealer that includes, using a certain learning model, additional information in a plurality of sound source signals or a mixed sound signal where the plurality of sound source signals is mixed together, in which a change in the sound source signals and the mixed sound signal caused by addition of the additional information is imperceptible.

(12)

The information processing apparatus according to (11), in which the concealer adds the additional information to the mixed sound signal where the plurality of sound source signals is mixed together.

(13)

The information processing apparatus according to (11), in which the concealer adds the additional information to at least one of the plurality of sound source signals.

(14)

The information processing apparatus according to (13), in which the concealer adds the additional information to all the plurality of sound source signals.

(15)

The information processing apparatus according to any one of (11) to (14), in which the learning model to be used when the additional information is included is selectable.

(16)

The information processing apparatus according to any one of (11) to (14), in which the learning model is a model obtained by performing learning for minimizing a loss function based on an error function between sound source signals before and after the additional information is included in the sound source signals, an error function between signals obtained by including the additional information in the sound source signals and signals corresponding to the sound source signals obtained through sound source separation, an error function between pieces of the additional information before and after the additional information is included in the sound source signals, and an error function between the additional information before the additional information is included in the sound source signals and the additional information included in the sound source signals obtained through the sound source separation.

(17)

The information processing apparatus according to any one of (11) to (16), in which the additional information is digital watermark information.

(18)

An information processing method including including, using a concealer and a certain learning model, additional information in a plurality of sound source signals or a mixed sound signal where the plurality of sound source signals is mixed together, in which a change in the sound source signals and the mixed sound signal caused by addition of the additional information is imperceptible.

(19)

A program causing a computer to perform an information processing method including including, using a concealer and a certain learning model, additional information in a plurality of sound source signals or a mixed sound signal where the plurality of sound source signals is mixed together, in which a change in the sound source signals and the mixed sound signal caused by addition of the additional information is imperceptible.

REFERENCE SIGNS LIST

2 distribution apparatus
3 playback apparatus
41 concealer
51, 51A, 51B, 51C decoder
100 learning model
305C sound source separation unit
305D decoder
WI digital watermark information

The invention claimed is:

1. An information processing apparatus comprising:

a decoder that extracts, using a certain learning model, additional information included in a mixed sound signal where a plurality of sound source signals is mixed together, wherein a change in the sound source signals and the mixed sound signal caused by addition of the additional information is imperceptible;

wherein the learning model is a model obtained by performing learning for minimizing a loss function based on an error function between sound source signals before and after the additional information is included in the sound source signals, an error function between signals obtained by including the additional information in the sound source signals and signals corresponding to the sound source signals obtained through sound source separation, an error function between pieces of the additional information before and after the additional information is included in the sound source signals, and an error function between the additional information before the additional information is included in the sound source signals and the additional information included in the sound source signals obtained through the sound source separation.

2. The information processing apparatus according to claim 1, wherein the additional information is information added to the mixed sound signal where the plurality of sound source signals is mixed together.

3. The information processing apparatus according to claim 1, wherein the additional information is digital watermark information.

4. The information processing apparatus according to claim 1, wherein the decoder extracts the additional information from separation signals obtained by performing sound source separation on the mixed sound signal.

5. The information processing apparatus according to claim 4, further comprising a sound source separation unit that performs the sound source separation.

6. The information processing apparatus according to claim 1, wherein at least one of the sound source signals constituting the mixed sound signal includes the additional information.

7. The information processing apparatus according to claim 6, wherein each of the sound source signals constituting the mixed sound signal includes the additional information.

8. An information processing apparatus comprising a concealer that includes, using a certain learning model, additional information in a plurality of sound source signals or a mixed sound signal where the plurality of sound source signals is mixed together, wherein a change in the sound source signals and the mixed sound signal caused by addition of the additional information is imperceptible;

wherein the learning model is a model obtained by performing learning for minimizing a loss function based on an error function between sound source signals before and after the additional information is included in the sound source signals, an error function between signals obtained by including the additional information in the sound source signals and signals corresponding to the sound source signals obtained through sound source separation, an error function between pieces of the additional information before and after the additional information is included in the sound source signals, and an error function between the additional information before the additional information is included in the sound source signals and the additional information included in the sound source signals obtained through the sound source separation.

9. The information processing apparatus according to claim 8, wherein the concealer adds the additional information to the mixed sound signal where the plurality of sound source signals is mixed together.

10. The information processing apparatus according to claim 8, wherein the learning model to be used when the additional information is included is selectable.

11. The information processing apparatus according to claim 8, wherein the additional information is digital watermark information.

12. The information processing apparatus according to claim 8, wherein the concealer adds the additional information to at least one of the plurality of sound source signals.

13. The information processing apparatus according to claim 12, wherein the concealer adds the additional information to all the plurality of sound source signals.

14. An information processing method comprising:

extracting, using a decoder and a certain learning model, additional information included in a mixed sound signal where a plurality of sound source signals is mixed together, wherein a change in the sound source signals and the mixed sound signal caused by addition of the additional information is imperceptible;

wherein the learning model is a model obtained by performing learning for minimizing a loss function based on an error function between sound source signals before and after the additional information is included in the sound source signals, an error function between signals obtained by including the additional information in the sound source signals and signals corresponding to the sound source signals obtained through sound source separation, an error function between pieces of the additional information before and after the additional information is included in the sound source signals, and an error function between the additional information before the additional information is included in the sound source signals and the additional information included in the sound source signals obtained through the sound source separation.

15. A non-transitory computer-readable medium storing a program causing a computer to perform an information processing method comprising:

extracting, using a decoder and a certain learning model, additional information included in a mixed sound signal where a plurality of sound source signals is mixed together, wherein a change in the sound source signals and the mixed sound signal caused by addition of the additional information is imperceptible;

wherein the learning model is a model obtained by performing learning for minimizing a loss function based on an error function between sound source signals before and after the additional information is included in the sound source signals, an error function between signals obtained by including the additional information in the sound source signals and signals corresponding to the sound source signals obtained through sound source separation, an error function between pieces of the additional information before and after the additional information is included in the sound source signals, and an error function between the additional information before the additional information is included in the sound source signals and the additional information included in the sound source signals obtained through the sound source separation.

16. An information processing method comprising:

including, using a concealer and a certain learning model, additional information in a plurality of sound source signals or a mixed sound signal where the plurality of sound source signals is mixed together, wherein a change in the sound source signals and the mixed sound signal caused by addition of the additional information is imperceptible;

wherein the learning model is a model obtained by performing learning for minimizing a loss function based on an error function between sound source signals before and after the additional information is included in the sound source signals, an error function between signals obtained by including the additional information in the sound source signals and signals corresponding to the sound source signals obtained through sound source separation, an error function between pieces of the additional information before and after the additional information is included in the sound source signals, and an error function between the additional information before the additional information is included in the sound source signals and the additional information included in the sound source signals obtained through the sound source separation.

17. A non-transitory computer-readable medium storing a program causing a computer to perform an information processing method comprising:

including, using a concealer and a certain learning model, additional information in a plurality of sound source signals or a mixed sound signal where the plurality of sound source signals is mixed together, wherein a change in the sound source signals and the mixed sound signal caused by addition of the additional information is imperceptible;

wherein the learning model is a model obtained by performing learning for minimizing a loss function based on an error function between sound source signals before and after the additional information is included in the sound source signals, an error function between signals obtained by including the additional information in the sound source signals and signals corresponding to the sound source signals obtained through sound source separation, an error function between pieces of the additional information before and after the additional information is included in the sound source signals, and an error function between the additional information before the additional information is included in the sound source signals and the additional information included in the sound source signals obtained through the sound source separation.

* * * * *